(12) United States Patent
Carlson et al.

(10) Patent No.: US 9,834,726 B2
(45) Date of Patent: Dec. 5, 2017

(54) FLAME RETARDANTS

(71) Applicant: EMPIRE TECHNOLOGY DEVELOPMENT LLC, Wilmington, DE (US)

(72) Inventors: William B. Carlson, Seattle, WA (US); Gregory D. Phelan, Cortland, NY (US); Walter Sadowski, Edmonds, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/655,293

(22) PCT Filed: Dec. 27, 2012

(86) PCT No.: PCT/US2012/071769
§ 371 (c)(1),
(2) Date: Jun. 24, 2015

(87) PCT Pub. No.: WO2014/105017
PCT Pub. Date: Jul. 3, 2014

(65) Prior Publication Data
US 2016/0032191 A1 Feb. 4, 2016

(51) Int. Cl.
*C09K 21/14* (2006.01)
*A62D 1/00* (2006.01)
*C07G 1/00* (2011.01)

(52) U.S. Cl.
CPC ............ *C09K 21/14* (2013.01); *A62D 1/0007* (2013.01); *A62D 1/0028* (2013.01); *A62D 1/0092* (2013.01); *C07G 1/00* (2013.01)

(58) Field of Classification Search
CPC ........ C09K 21/14; C07G 1/00; A62D 1/0007; A62D 1/0028; A62D 1/0092
See application file for complete search history.

(56) References Cited

U.S. PATENT DOCUMENTS

| | | | |
|---|---|---|---|
| 3,259,501 A * | 7/1966 | George | A23K 1/146 426/319 |
| 3,862,854 A | 1/1975 | Zeigerson et al. | |
| 3,962,208 A | 6/1976 | Zeigerson et al. | |
| 6,409,817 B1 | 6/2002 | Stephens | |
| 6,875,263 B1 * | 4/2005 | Pillai | C04B 35/62213 106/406 |
| 2005/0176833 A1 | 8/2005 | Tay | |
| 2008/0227896 A9 | 9/2008 | Ebeling et al. | |
| 2009/0077760 A9 | 3/2009 | Lally | |
| 2010/0206501 A1 | 8/2010 | Medoff | |

(Continued)

FOREIGN PATENT DOCUMENTS

CN 101769021 A 7/2010
WO WO-2011/016773 A1 2/2011

OTHER PUBLICATIONS

Che Man et al, "Adsorption Potential of Unmodified Rice Husk for Boron Removal," BioResources 7(3) 3810-3822, Jul. 2012.*

(Continued)

*Primary Examiner* — Hai Vo
(74) *Attorney, Agent, or Firm* — Maschoff Brennan

(57) ABSTRACT

Methods and compositions pertaining to flame retardants using micronized rice husks are disclosed.

16 Claims, 9 Drawing Sheets

(56) References Cited

U.S. PATENT DOCUMENTS

2010/0282632 A1 11/2010 Schabel, Jr.
2011/0098384 A1 4/2011 Blount

OTHER PUBLICATIONS

Imoisili et al, "Effect of Silane Coupling Agent on the Tensile Properties of Rice Husk Flour (RHF) Polyester Composite," The Pacific Journal of Science and Technology 13(1) 457-462, May 2012.*
Morsi et al, "Chemical and Nanomechanical Analysis of Rice Husk Modified by ATRP-Grafted Oligomer," J Colloid Interface Sci. 360(2) 1-23, Aug. 2011.*
Maziad et al, "The Effect of a Silane Coupling Agent on Properties of Rice Husk-Filled Maleic Acid Anhydride Compatibilized Natural Rubber/Low-Density Polyethylene Blend," J Matter Sci. 44 2665-2673, 2009.*
Seo et al, "Silicon Tetrachloride Production by Chlorination Method Using Rice Husk As Raw Material," Journal of Materials Processing Technology 141 351-356, 2003.*
Belonio, A.T., "Rice Husk Gas Stove Handbook," Appropriate Technology Center. Department of Agricultural Engineering and Environmental Management, College of Agriculture, Central Philippine University, Iloilo City, Philippines, pp. 1-155 (2005).
Boonkrai, S.; Aht-Ong, D, "Effect of 3-aminopropyltrimethoxysilane-g-rice husk silica on flame retardant of ABS/organomontmorillonite nanocomposites," (2010) Advanced Materials Research (Zuerich, Switzerland), 93-94(Functionalized and Sensing Materials), 91-94.
Forostyan, Yu. N., "Modification of Lignin by Phosphorylation and amination," Chemistry of Natural Compounds (1977) 13:474-476.
Korich et al. "Chemical modification of organosolv lignin using boronic acid-containing reagents," (Jan. 5, 2012) Polymer 53(1) 87093.
Kennedy, L., J., et al., "Effect of Two-Stage Process on the Preparation and Characterization of Porous Carbon Composite from Rice Husk by Phosphoric Acid Activation," (2004) Ind. Eng. Chem. Res. 43 (8), 1832-1838.
Lewin M., "Flame Retarding of Wood by Chemical Modification with Bromate-Bromide Solutions," (1997) Journal of Fire Sciences 15:29-51.
Maziad, N.A., "The effects of a silane coupling agent on properties of rice husk-filled maleic acid anhydride compatibilized natural rubber/low-density polyethylene blend," Journal of Materials Science, vol. 44, Issue 10, pp. 2665-2673 (May, 2009).
M. Sain, et al., "Flame retardant and mechanical properties of natural fibre-PP composites containing magnesium hydroxide Polymer," (2004) Degradation and Stability 83(2) 363-367.
Otsubo et al., "Effect of surface modification of colloidal silica on the electrorheology of suspensions," (1991) Journal of Colloid and Interface Science 146(2), 395-404.
PCT International Search Report and Written Opinion for PCT/US2012/071769 dated Mar. 7, 2013.
Qiang Zhao, et al., "Flame retardancy of rice husk-filled high-density polyethylene ecocomposites," (2009) Composites Science and Technology 69 (15-16) pp. 2675-2681.
R. Kozlowski, et al., "Flame resistant lignocellulosic-mineral composite particleboards," (1999) Polymer Degradation and Stability 64(3) 523-528.
Sadownick B.A., et al., "Enzymatic treatment of lignochemicals; adhesive and resin uses," (1988) Biomass 15(2) 77-92.
Saka S. et al. "Comparative Studies on Lignin Distribution by UV Microscopy and Bromination Combined with EDXA," (1982) Wood Science and Technology 16(4): 269-277.
Sang-Eun Ryu, et al., "Pulverization of rice husks and the changes of husk densities," Journal of Materials Science, vol. 32, Issue 24, pp. 6639-6643 (Dec. 1997).
Ungureanu et al. "Chemical Modification and Characterization of Straw Lignin," Cellulose Chemistry and Technology (2009) 43 (7-8), 263-269.

\* cited by examiner

R=

R = OH or H

FLAME RETARDANTS

CROSS-REFERENCE TO RELATED APPLICATION

The present application is a U.S. National Stage Application under 35 U.S.C. §371 of International Application No. PCT/US2012/071769, filed on Dec. 27, 2012, the entire contents of which are incorporated herein by reference in its entirety.

TECHNICAL FIELD

This disclosure relates generally to methods and compositions pertaining to flame retardants comprising micronized rice husks.

BACKGROUND

Rice husks are a byproduct of rice production. Rice husks are primarily made of silica, carbides, or nitrides of silicon, which offer protection to the rice kernels as they grow. The rice husks also contain an organic polymer called lignin, which gives a distinctive yellowish color to the husks. After harvesting, e.g., for use as a food, the rice is separated from the husks.

Currently, the majority of rice husks are incinerated at great expense, e.g., in fuel and carbon footprint. Some additional usages of rice husks include as an additive to concrete, housing in some third world countries, production of sandcrete from rice husk ash, and the manufacture of shoes, to name a few.

Rice husks have also been used in the production of light weight foam-entrained composite partition wall. Typically, the composite partition wall includes exterior panels and interior core materials. The exterior panels are obtained from mixing cement, sawdust, rice hull, fly ash, fireproof low-alkali mesh fabric, galvanized iron wire mesh, a water-reducing agent, bentonite, acrylate copolymer emulsion and water.

SUMMARY

The foregoing summary is illustrative only and is not intended to be in any way limiting. In addition to the illustrative aspects, embodiments and features described above, further aspects, embodiments and features will become apparent by reference to the following drawings and the detailed description.

The compositions and methods described herein relate to flame retardants comprising micronized rice husks.

In one aspect, the present technology provides a flame retardant comprising: rice husk comprising silica and lignin in which the rice husk is micronized to an effective size and the lignin is chemically modified.

In one aspect, the present technology provides a composition comprising a substrate and a flame retardant in which the flame retardant comprises rice husk. In some embodiments, the rice husk comprises silica and lignin and the rice husk is micronized to an effective size. In some embodiments, the silica and lignin are chemically modified.

In one aspect, the present technology provides a flame retardant comprising: rice husk comprising silica and lignin, in which the rice husk is micronized to an effective size, and the silica is chemically modified.

In one aspect, the present technology provides a composition comprising a substrate and the flame retardant in which the flame retardant comprises rice husk. In some embodiments, the rice husk comprises silica and lignin in which the rice husk is micronized to an effective size and the silica is chemically modified.

In one aspect, the present technology provides a method of making a flame retardant. In some embodiments, the method includes micronizing rice husk to an effective size, in which the rice husk comprises silica and lignin; and chemically modifying the lignin component of the micronized rice husk.

In one aspect, the present technology provides a method of making a flame retardant. In some embodiments, the method includes micronizing rice husk to an effective size, in which the rice husk comprises silica and lignin; and chemically modifying the silica component of the micronized rice husk.

In one aspect, the present technology provides a method of retarding a flame. The method includes applying to the flame a flame retardant comprising rice husk, in which the rice husk comprises silica and lignin. In some embodiments, the rice husk is micronized to an effective size and the lignin is chemically modified.

In one aspect, the present technology provides a method of retarding a flame. In some embodiments, the method includes applying to the flame a flame retardant comprising rice husk, in which the rice husk comprises silica and lignin. In some embodiments, the rice husk is micronized to an effective size, and the silica is chemically modified.

In one aspect, the present technology provides a method of making a substrate flame retardant. In some embodiments, the method includes contacting the substrate with a flame retardant comprising rice husk, in which the rice husk comprises silica and lignin. In some embodiments, the rice husk is micronized to an effective size, and the lignin is chemically modified.

In one aspect, the present technology provides a method of making a substrate flame retardant. In some embodiments, the method includes contacting the substrate with a flame retardant, in which the flame retardant comprising: rice husk. In some embodiments, the rice husk comprises silica and lignin. In some embodiments, the rice husk is micronized to an effective size. In some embodiments, the silica and lignin are chemically modified.

In one aspect, the present technology provides a method of making a substrate flame retardant. In some embodiments, the method includes contacting the substrate with flame retardant comprising: rice husk. In some embodiments, the rice husk comprises silica and lignin and the rice husk is micronized to an effective size. In some embodiments, the silica is chemically modified.

DETAILED DESCRIPTION

Figure 1:
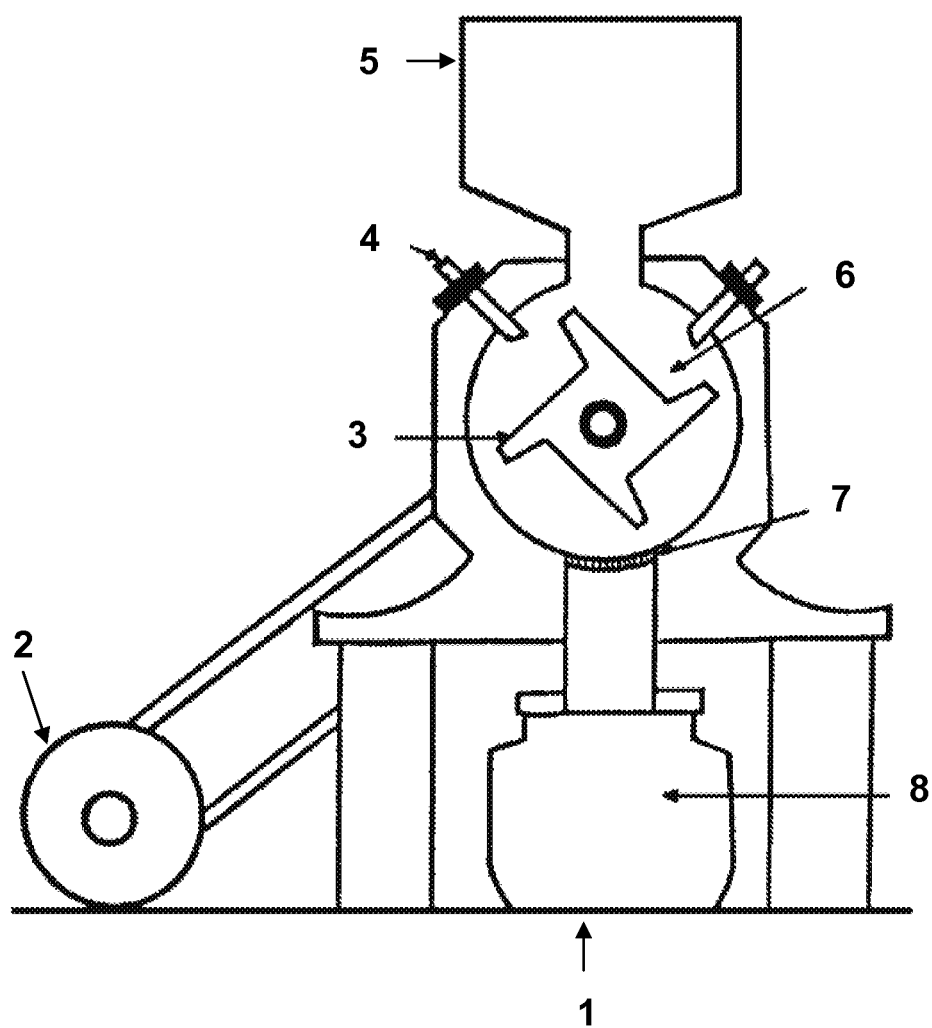
FIG. 1 shows schematic drawing of the rotating knife cutter (1) that can be used to mill the rice husks. The rotating knife cutter includes a motor (2), rotating knife (3), stationary knife (4), hopper (5), milling room (6), screen (7), and a container (8).

In the following detailed description, reference is made to the accompanying drawings, which form a part hereof. In the drawings, similar symbols typically identify similar components, unless context dictates otherwise. The illustrative embodiments described in the detailed description and claims are not meant to be limiting. Other embodiments may be used, and other changes may be made, without departing from the spirit or scope of the subject matter presented here.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Flame Retardant

As used herein, "flame retardant" refers to a composition that inhibits or resists the spread of flame, or is capable of extinguishing a flame. In some embodiments, a flame retardant of the present technology may be applied to the surface of a substrate and/or may be incorporated into a substrate to reduce the flammability of the substrate.

In some embodiments, the flame retardant comprises rice husk, for example in some embodiments, the flame retardant comprises micronized rice husk. In some embodiments, the lignin component of the micronized rice husk may be chemically modified to include one or more moieties. Non-limiting examples of such moieties include halogen, boric acid, boronic acid, phosphoric acid esters, sulfhydryl groups, sulfate groups, organic carbonate, and inorganic carbonate.

In some embodiments, the silica component of the micronized rice husk may be chemically modified to comprise one or more moieties. Non-limiting examples of such moieties include an amine group, a hydroxyl group, a silane, isocyanate, vinyl, siloxane, thiol, sulfate, phosphine, phosphate, boronic acid, and borate.

In some embodiments, the flame retardant includes micronized rice husk in which both the lignin and the silica component are chemically modified.

In some embodiments, the flame retardant may include halogenated materials that undergo thermal degradation and release halide ions. Typically, halides react with the highly reactive H• or (OH)• radicals in the flame, resulting in an inactive molecule and a halogen radical. The halogen radical has lower energy than H• or (OH)• radicals, and therefore has a lower potential to propagate the radical oxidation reactions of combustion. In some embodiments, the halogenated material may be halogenated lignin.

Additionally or alternatively, in some embodiments, the flame retardant may create a thermal insulation barrier between the flame and unburned materials. In some embodiments, the flame retardant may create a thermal insulation barrier between the flame and unburned materials which is capable of further quenching the H• or (OH)• radicals.

In some embodiments, the flame retardant may include one or more inert gases. Exemplary inert gases include, but are not limited to, carbon dioxide and nitrogen. Additionally or alternatively, in some embodiments, the flame retardant comprises water.

In some embodiments, the flame retardant may be in the form of a dry powder, gel, liquid, or liquid slurry. In some embodiments, the flame retardant may be propelled towards the flame. Exemplary propellants include, but are not limited to, nitrogen and carbon dioxide gas.

In some embodiments, the flame retardant comprising micronized rice husk is capable of extinguishing a flame. In some embodiments, the silica component of the micronized rice husk may be chemically modified to include one or moieties. In some embodiments, the lignin component of the micronized rice husk may be chemically modified to include one or more moieties. In some embodiments, the flame retardant may include micronized rice husk in which both the lignin and the silica component are chemically modified. In some embodiments, the flame retardant comprising micronized rice husk that extinguishes a flame may be in the form of a dry powder, liquid, gel, foam, or wet slurry.

Micronization of Rice Husk

As used herein, micronization refers to the process of reducing the average diameter of a solid material's size. Micronized in the context of rice husks refers to reducing the average size (e.g., average diameter) of the rice husks to an effective size, e.g., in the range of a minimum of at least few nanometers to a maximum of 1 millimeter.

In some embodiments, the effective size (e.g., average diameter) of the micronized rice husks ranges from at least about 10 nm to about 750 µm. In some embodiments, the effective size of the micronized rice husks ranges from at least about 10 nm to about 100 nm. In some embodiments, the effective size of the micronized rice husks ranges from at least about 100 nm to about 1 µm. In some embodiments, the effective size of the micronized rice husks ranges from at least about 1 µm to about 100 µm. In some embodiments, the effective size of the micronized rice husks ranges from at least about 10 µm to about 100 µm. In some embodiments, the effective size of the micronized rice husks ranges from at least about 50 µm to about 100 µm. In some embodiments, the effective size of the micronized rice husks is about 50 µm.

In some embodiments, the effective size of the micronized rice husk is at least about: 10 nm, 20 nm, 40 nm, 50 nm, 100 nm, 150 nm, 200 nm, 250 nm, 300 nm, 400 nm, 500 nm, 750 nm, 1 µm, 1.5 µm, 2 µm, 4 µm, 5 µm, 10 µm, 25 µm, 50 µm, 100 µm, 150 µm, 250 µm, 300 µm, 500 µm, 750 µm or more in diameter, but less than about 1 mm. In some embodiments, the effective size of the micronized rice husk is about 1 µm to about 750 µm. In some embodiments, the effective size of the micronized rice husk is about 1 µm to about 100 µm. In some embodiments, the effective size of the micronized rice husk is about 50 µm to about 100 µm. In some embodiments, the effective size of the micronized rice husk is about 10 µm to about 90 µm. In some embodiments, the effective size of the micronized rice husk is about 30 µm to about 70 µm. In some embodiments, the effective size of the micronized rice husk is about 40 µm to about 60 µm.

In some embodiments, the effective size of the micronized rice husk is too large to be inhaled into the lungs, but still has a sufficiently high surface area to be effective as a flame retardant. In some embodiments, the effective size of the micronized rice husk too large to be inhaled into the lungs is at least about 10 µm. In another example, the effective size of the micronized rice husk too large to be inhaled is at least about 10 µm to about 750 µm. In another example, the effective size too large to be inhaled into the lungs is about 10 µm. In another example the effective size of the micronized rice husk too large to be inhaled is at least about 50 µm (about 400 mesh) in diameter. In another example, the effective size of the micronized rice husk too large to be inhaled is about 50 µm (about 400 mesh) in diameter.

Substrate which Flame Retardant Properties are Sought

As used herein, "substrate" in the context of flame retardant refers to a material for which flame retardant properties are sought. In some embodiments, the substrate is flammable, or more flammable, in the absence of flame retardant. In some embodiments, the substrate is in the form of a solid. In some embodiments, the substrate is in the form of a liquid, gel, paste, foam, or wet slurry. In some embodiments, the substrate is pliable. In some examples, the substrate is rigid.

Exemplary substrates for which flame retardant properties are sought include, but are not limited to, wood, particle board, metal beams and rods, concrete, plastic, ceramic, glass, cellulose, unsaturated polyester resins, vinylether resins, polyurethane resins, phenol resins, epoxy resins, polystyrene, ABS resin, polyethylene, polypropylene, polyvinyl chloride (PVC) resin, polyamine (PA), polyacrylates such as polymethyl methacrylate (PMMA), polycarbonate (PC), polyesters such as polyethylene terephthalate (PET) or polybutylene terephthalate (PBT), polyether sulfones (PES), polyether ketones or polyether sulfides (PES) or mixtures thereof, insulations of electrical cables, PVC pipes, paper, paint, pigment, varnishes, fabric, adhesives, cotton fiber, jute, hemp, and printed circuit board. In some embodiments, the substrate is a fabric, such as wool, polyester, cotton (e.g., cellulose of cotton fiber) and mixtures thereof. In another embodiment, the substrate is urethane foam. In some embodiments, the substrate includes materials used in buildings. Exemplary substrate for which flame retardant properties are sought, used in building materials include, but are not limited to, lumber, roof shingles, roof tiles such as concrete and clay roof tiles, stucco, cinder blocks, clay bricks, gypsum boards, rock wool, perlite board, sheet rock, plastic composites, paints, varnishes and sealers.

Cellulosic Fiber

The term "cellulosic" or "cellulosic fiber" as used herein, generally refers to a fiber composed of, or derived from, cellulose, which is a chief component of the cell walls of plants. Examples of cellulosic fibers include cotton, rayon, linen, jute, hemp, and cellulose acetate, although the most common example is cotton and, as such, cotton will be an exemplary cellulosic fiber of the present disclosure. The cellulosic content of blended fabrics contributes significantly to its hand, drape, and breathability, characteristics which provide comfort to wearers, and/or enhance style or function.

Micronizing Rice Husk of the Present Technology

Raw rice husks are very low in apparent density. Accordingly, in some embodiments, rice husks may be micronized to an effective size to increase their apparent density. In some embodiments, the reaction rates of the chemical modification of lignin and/or silica in the rice husk may be increased due to increase in surface area. In some embodiments, micronizing the rice husk may provide more rice husks material available as flame retardant per unit weight.

In some embodiments, rice husks may be micronized by milling the rice husks. One exemplary method for micronizing rice husks is disclosed by Ryu et al. (Pulverization of rice husks and the changes of husk densities (1997) Journal of Materials Science 32 6639-43). In some embodiments, rice husks may be cut with blades having sharp edges. In some embodiments, a rotating knife cutter may be used for milling rice husks. A schematic drawing of an exemplary rotating knife cutter that can be used for milling rice husks is shown in FIG. 1. The size of the micronized rice husk may be controlled by a screen inserted at the bottom of the milling chamber. In some embodiments, the rice husks may be continuously comminuted in the milling chamber until they become small enough to pass through the inserted screen. Micronizing rice husk by milling is typically an inexpensive process, and micronized rice husk can be produced in large quantities as required.

Chemical Modification of Lignin in Rice Husk

Figure 2:
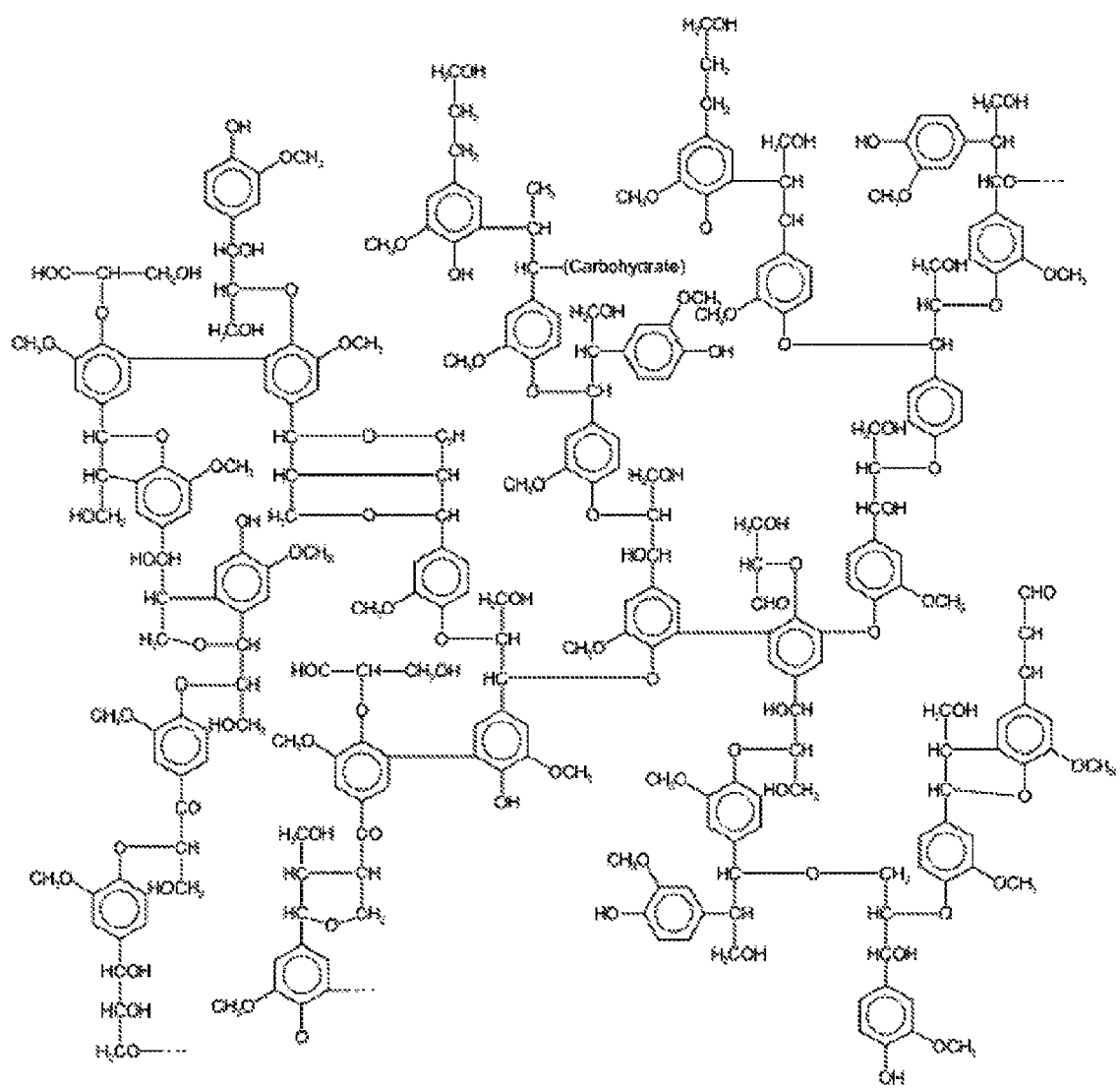
FIG. 2 shows the structure of lignin.

Lignin is an organic polymer and a major component of rice husk. Typically, lignin includes phenolic groups and aliphatic hydroxyl groups. The structure of lignin is shown in FIG. 2.

As noted previously, in some embodiments, chemical modification of lignin in micronized rice husk may include the addition of one or more of moieties including but not limited to: halogen, boric acid, boronic acid, phosphoric acid esters, sulfhydryl groups, sulfate groups, organic carbonate, and inorganic carbonate. The molar ratio of lignin to modifying group in the micronized rice husks can be varied by varying the amount of the reaction components, reaction time, and the reaction temperature. In some embodiments, the molar ratio of lignin to modifying group in the micronized rice husks comprising chemically modified lignin may be at least about: 1:0.0001, 1:0.001, 1:0.01, 1:0.05, 1:0.1, 1:0.25, 1:0.5, 1:0.75, 1:1, 1:1.01, 1:1.05, 1:1.1, 1:1.25, 1:1.5, 1:2, 1:2.5, 1:3, 1:3.5, 1:5, 1:10, 1:25, 1:50, to about 1:100. In some embodiments, the molar ratio of lignin to modifying group in the micronized rice husks comprising chemically modified lignin may be about 1:0.0001, 1:0.001, 1:0.01, 1:0.05, 1:0.1, 1:0.25, 1:0.5, 1:0.75, 1:1, 1:1.01, 1:1.05, 1:1.1, 1:1.25, 1:1.5, 1:2, 1:2.5, 1:3, 1:3.5, 1:5, 1:10, 1:25, 1:50, 1:100.

Figure 3:
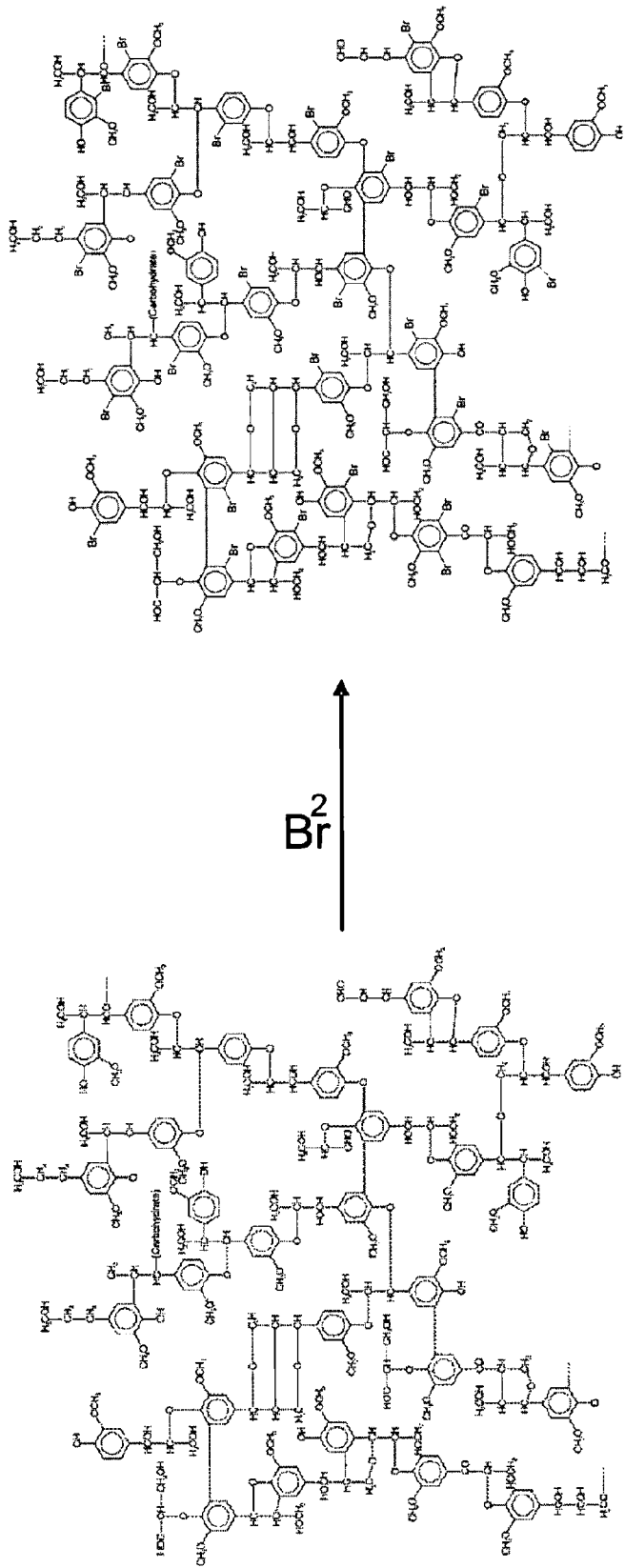
FIG. 3 shows an exemplary reaction schematic of the incorporation of bromine into the lignin structure.

In some embodiments, lignin in micronized rice husk may be modified with one or more halogens such as chlorine, bromine, or iodine, or fluorine such that halogen moieties are incorporated into the lignin structure. In some embodiments, the halogenated organic structure may add additional flame retardant capability when applied to a substrate without harming the environment. Without wishing to be bound by theory, lignin containing halogen moieties decomposes homolytically to form radicals when heated. The radicals combine with oxygen and other combustion radicals. The combination of halogen and combustion radicals stops the combustion process. Unlike halogenated retardants currently available, the halogen is not a liquid or gas and stays within the husk. As such, the halogenated flame retardants disclosed herein diminish, or prevent the toxic effects that most halogenated flame retardants have. An exemplary reaction schematic showing the incorporation of bromine into the lignin structure is shown in FIG. 3.

The molar ratio of lignin:halogen in the micronized rice husks comprising halogen modified lignin can be varied by varying the amount of the reaction components, reaction time, and the reaction temperature. In some embodiments, the molar ratio of lignin to halogen in the micronized rice husks comprising halogen modified lignin may be at least about: 1:0.0001, 1:0.001, 1:0.01, 1:0.05, 1:0.1, 1:0.25, 1:0.5, 1:0.75, 1:1, 1:1.01, 1:1.05, 1:1.1, 1:1.25, 1:1.5, 1:2, 1:2.5, 1:3, 1:3.5, 1:5, 1:10, 1:25, 1:50, to about 1:100. In some embodiments, the molar ratio of lignin to halogen in the micronized rice husks comprising halogen modified lignin may be about 1:0.0001, 1:0.001, 1:0.01, 1:0.05, 1:0.1, 1:0.25, 1:0.5, 1:0.75, 1:1, 1:1.01, 1:1.05, 1:1.1, 1:1.25, 1:1.5, 1:2, 1:2.5, 1:3, 1:3.5, 1:5, 1:10, 1:25, 1:50, 1:100.

In some embodiments, the halogen content in modified lignin may be from about 1% to about 200% by weight of lignin. In some embodiments, the halogen content in modified lignin may be about 1%, 2%, 5%, 6%, 7%, 8%, 9%, 10%, 12.5%, 15%, 20%, 25%, 30%, 35%, 40%, 45%, 50%, 55%, 60%, 70%, 75%, 80%, 85%, 90%, 95%, 100%, 110%, 120%, 130%, 140%, 150%, 160%, 170%, 175%, 180%, 190%, 200% by weight of lignin.

Figure 4A:
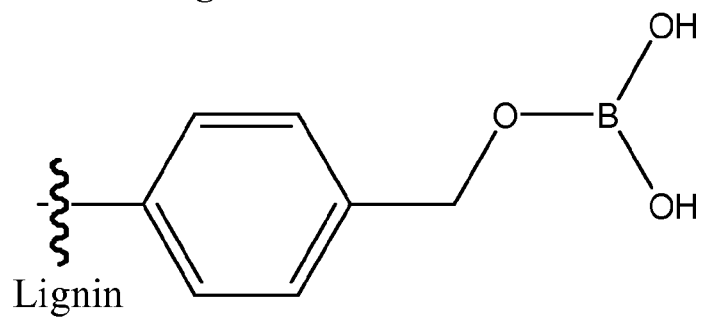
FIGS. 4A and B show an exemplary structure of lignin modified with boric acid (4A) or boronic acid (4B) into the lignin structure.
Figure 4B:
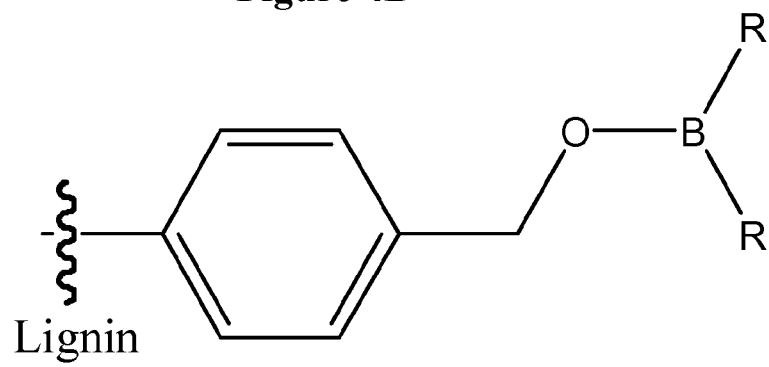
Figure 4B:
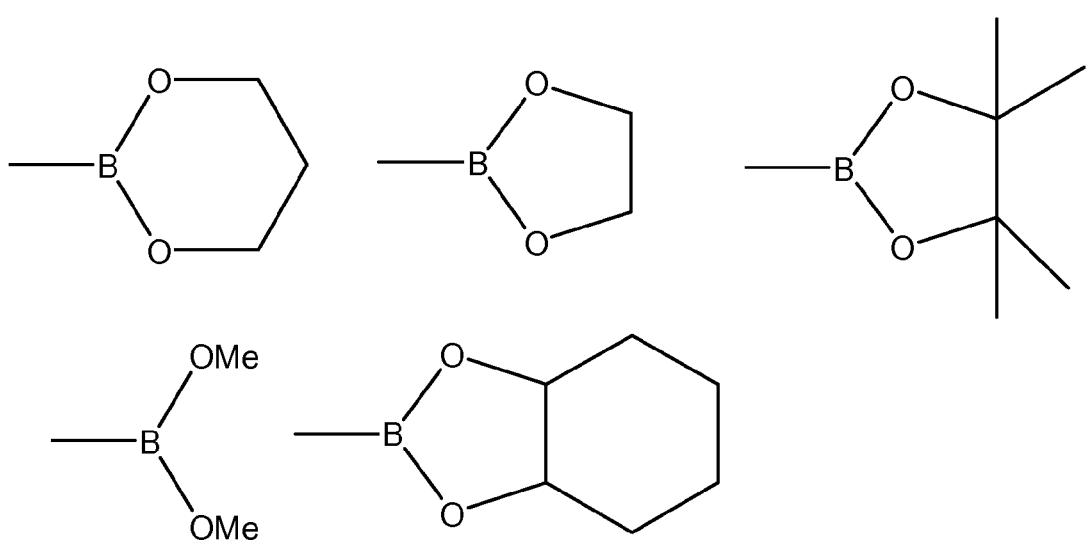

Additionally or alternatively, in some embodiments, the lignin in micronized rice husks may be chemically modified with boric acid or boronic acid such that the free hydroxyl groups of lignin are linked with boric acid or boronic acid moiety as shown in FIGS. 4A and 4B respectively. One exemplary method for chemically modifying lignin with boronic acid is disclosed by Korich et al. (Chemical modification of organosolv lignin using boronic acid-containing reagents (2012) Polymer 53(1) 87-93). The addition of boron to lignin enhances the flame retardant properties of lignin.

Figure 5:
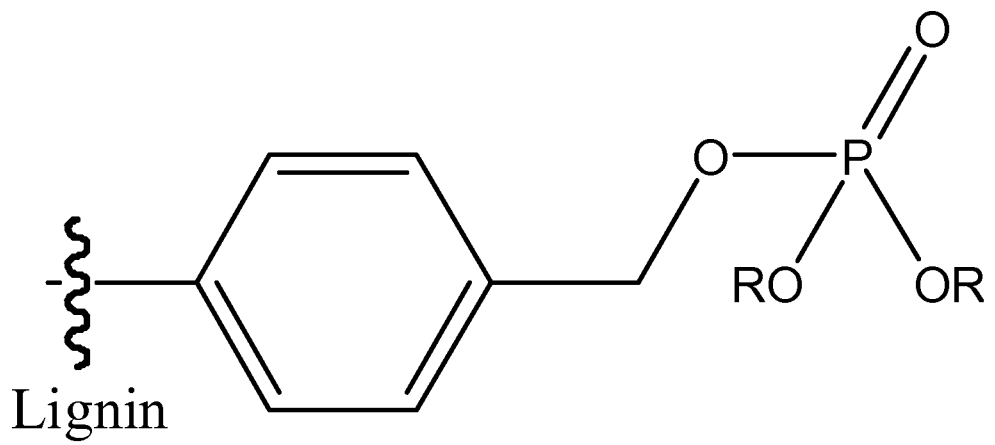
FIG. 5 shows an exemplary structure of lignin modified with phosphoric acid or phosphines. R=H, organic moiety, alkyl, alkene, alkyne, aromatic, —C(=O)—CH3, —C(=O)—Ar, Na, K, Ca, Fe, Zr, Ti, Co, Cu, Ni, Zn, ether, ester, cyclo, hetero containing, or cation.

In some embodiments, the lignin in micronized rice husk is chemically modified by reaction with phosphoric acids and phosphines to form phosphoric acid esters. One exemplary method for chemically modifying lignin by phosphorylation and amination is disclosed by Forostyan, Yu. N. (Chemistry of Natural Compounds (1977) 13: 474-476). An exemplary structure of lignin modified with phosphoric acid or phosphines is shown in FIG. 5. In some embodiments, the addition of phosphorus moieties to lignin enhances the flame retardant properties of lignin. Phosphates inhibit or prevent combustion by preventing oxygen from participating in the combustion process.

Figure 6A:
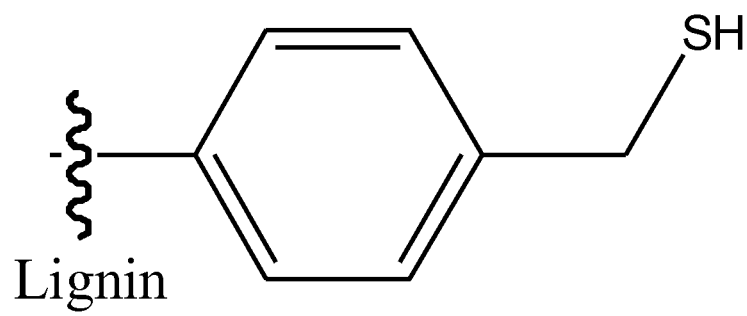
FIGS. 6A and B show an exemplary structure of lignin modified with sulfhydryl group (6A) and sulfate group (6B).
Figure 6B:
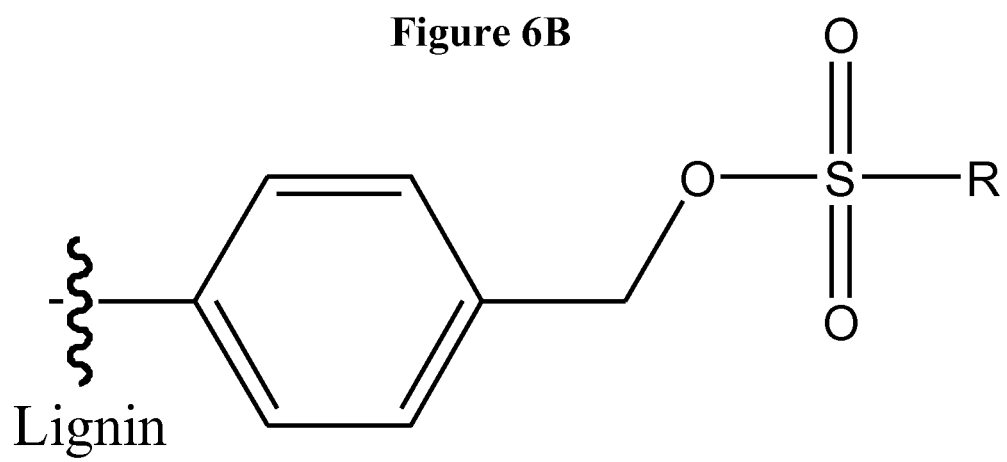

Additionally or alternatively, in some embodiments, the lignin in micronized rice husk may be chemically modified by the addition of sulfhydryl groups and/or sulfate groups. An exemplary structure of lignin modified with a sulfhydryl group and a sulfate group is shown in FIGS. 6A and 6B. Additionally or alternatively, in some embodiments, the lignin in micronized rice husk may be chemically modified by organic carbonate and inorganic carbonate to enhance the flame retardant properties of lignin. One exemplary method for chemically modifying lignin by organic carbonate and inorganic carbonate is disclosed by Sadownick B. A. and Farrell R. (Enzymatic treatment of lignochemicals; adhesive and resin uses (1988) Biomass 15(2) 77-92).

Chemical Modification of Silica in Rice Husk

Silica or carbides or nitrides of silicon are major components of rice husk. The rice husks may be functionalized by chemical modification of silica by incorporating functional moieties on the silica. The functionalized and micronized rice husk particles disclosed herein may be used in a wide variety of applications. In some embodiments, rice husks can be polymerized with other compounds (e.g., substrates) via the functional moieties at the surface of the micronized husk. For example, micronized and functionalized rice husks may be polymerized into various polymer networks such as urethanes to make flame resistant foams or polymerized with cellulosic fibers of cotton or natural fibers to make flame resistant cloth. The functional moieties can also aid in dispersing the particles in solvents such as water, oils, or organics.

In some embodiments, the chemical modification of silica may include the addition of one or more of functional groups including but not limited to: an amine group, a hydroxyl group, a silane, isocyanate, vinyl, siloxane, thiol, sulfate, phosphine, phosphate, boronic acid, borate and combinations thereof. In some embodiments, the functional group may include silane. Molar ratios of silica:one or more function groups in the micronized rice husks can be varied by varying the amount of the reaction components, reaction time, and the reaction temperature. In some embodiments, the molar ratio of silica to one or more function groups in the micronized rice husks comprising chemically modified silica may be at least about 1:0.0001, 1:0.001, 1:0.01, 1:0.05, 1:0.1, 1:0.25, 1:0.5, 1:0.75, 1:1, 1:1.01, 1:1.05, 1:1.1, 1:1.25, 1:1.5, 1:2, 1:2.5, 1:3, 1:3.5, 1:5, 1:10, 1:25, 1:50, to about 1:100. In some embodiments, the molar ratio of silica to one or more function groups in the micronized rice husks comprising chemically modified silica may be about 1:0.0001, 1:0.001, 1:0.01, 1:0.05, 1:0.1, 1:0.25, 1:0.5, 1:0.75, 1:1, 1:1.01, 1:1.05, 1:1.1, 1:1.25, 1:1.5, 1:2, 1:2.5, 1:3, 1:3.5, 1:5, 1:10, 1:25, 1:50, or 1:100.

Figure 7:
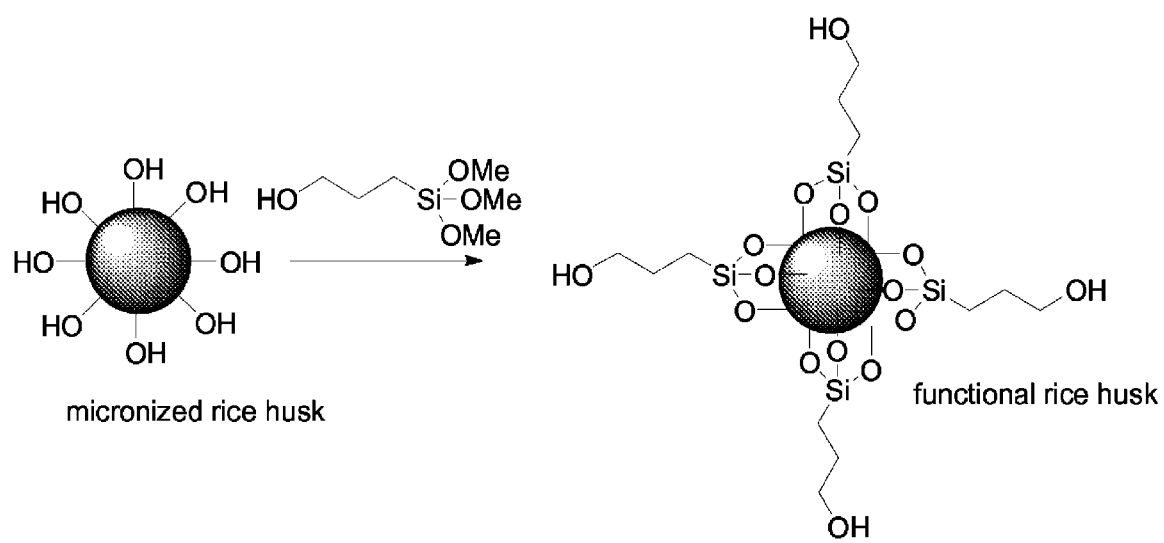
FIG. 7 shows an exemplary reaction schematic of the incorporation of silane moiety to the silica component of rice husk.

In some embodiments, the micronized rice husks may be functionalized by the incorporation of one or more silane moieties to the silica component of rice husk. In one non-limiting example, micronized rice husks are reacted with 3-hydroxypropyltrimethoxysilane, such that the silane moieties are coupled with the Si—OH moieties as shown in FIG. 7. One exemplary method for chemically modifying the silica component of rice husk by incorporation of one or more silane moieties is disclosed by Otsubo et al. (Effect of surface modification of colloidal silica on the electrorheology of suspensions (1991) Journal of Colloid and Interface Science 146(2), 395-404).

Molar ratios of silica to silane in the micronized rice husks comprising silane modified silica can be varied by varying the amount of the reaction components, reaction time, and the reaction temperature. In some embodiments, the molar ratio of silica to silane in the micronized rice husks comprising silane modified silica may be at least about 1:0.0001, 1:0.001, 1:0.01, 1:0.05, 1:0.1, 1:0.25, 1:0.5, 1:0.75, 1:1, 1:1.01, 1:1.05, 1:1.1, 1:1.25, 1:1.5, 1:2, 1:2.5, 1:3, 1:3.5, 1:5, 1:10, 1:25, 1:50, to about 1:100. In some embodiments, the molar ratio of silica to silane in the micronized rice husks comprising silane modified silica may be about 1:0.0001, 1:0.001, 1:0.01, 1:0.05, 1:0.1, 1:0.25, 1:0.5, 1:0.75, 1:1, 1:1.01, 1:1.05, 1:1.1, 1:1.25, 1:1.5, 1:2, 1:2.5, 1:3, 1:3.5, 1:5, 1:10, 1:25, 1:50, or 1:100.

In some embodiments, the silane content in modified in modified silica may be from about 1% to about 200% by weight of silica. In some embodiments, the silane content in modified silica may be about 1%, 2%, 5%, 6%, 7%, 8%, 9%, 10%, 12.5%, 15%, 20%, 25%, 30%, 35%, 40%, 45%, 50%, 55%, 60%, 70%, 75%, 80%, 85%, 90%, 95%, 100%, 110%, 120%, 130%, 140%, 150%, 160%, 170%, 175%, 180%, 190%, 200% by weight of silica.

In some embodiments, the silica component of the micronized rice husks can be chemically modified to silicon carbonate. For example, in some embodiments, micronized rice husks are reacted with $CO_2$ under high pressure (such as 8-26 GPa) and temperature (such as 296°-980° K) such that the silica in the micronized rice husks is chemically modified to silicon carbonate.

In some embodiments, the silica is modified to include one or more of isocyanate, vinyl, siloxane, thiol, sulfate, phosphine, phosphate, boronic acid, and borate moieties. Exemplary methods for incorporating such moieties onto silica of the rice husk are disclosed by Otsubo et al. (Effect of surface modification of colloidal silica on the electrorheology of suspensions (1991) Journal of Colloid and Interface Science 146(2), 395-404).

Flame Retardants comprising Micronized, Chemically Modified Rice Husk

The present disclosure provides flame retardants comprising micronized rice husks, including chemically modified lignin, chemically modified silica, or both, chemically modified silica and lignin, that have surprising and unexpected flame retarding properties.

In some embodiments, the flame retardants disclosed herein are environmentally benign, non-toxic, non-carcinogenic, non-mutagenic, non-teratogenic, and/or do not harm the reproductive tract. Additionally or alternatively, in some embodiments, the decomposition products are environmentally benign, non-toxic, non-mutagenic and/or are non-teratogenic. Typically, the flame retardants of the present disclosure have low manufacturing cost and can be produced and used in large amounts, as required. Additionally or alternatively, in some embodiments, the flame retardants of the present disclosure are non-reactive, non-corrosive, can be used for a wide variety of fire types A-F, and/or have high combustion suppression capacity per unit weight of the flame retardant. By way of exemplary advantage, the environmental benign nature of the flame retardants of the present disclosure allows them to be used on large forest fires.

Flame retardants comprising micronized rice husks including chemically modified lignin, or chemically modified silica, or both, can be used in wet, dry, liquid, paste, gel, foam, or slurry form in wide variety of applications.

Use of Micronized Rice Husks as Flame Extinguishers

In one embodiment, compositions comprising micronized rice husks comprising chemically modified lignin, chemically modified silica, or both, (e.g., the flame retardants described above) can be used as flame extinguishers. Extinguishers are used to combat fires that have already erupted. Flame extinguishers are typically classified A-F. This system designates the type of fire for which a flame extinguisher is suitable. Class A fires involve organic solids such as paper and wood. Class B fires involve flammable or combustible liquids. Gasoline, grease, and oil fires are included in this class. Class C fires involve flammable gases. Class D fires involve combustible metals. Class E fires involve electrical appliances (no longer used as when the power supply is turned off an electrical fire can fall into any category). Class F fires involve cooking fat and oil. In some embodiments of the present technology, micronized rice husks comprising halogenated lignin can be used to extinguish any class of fire.

In some embodiments, flame retardants comprising micronized rice husk comprising halogenated lignin may be used in the form of a dry powder as a fire extinguisher which in some embodiments, may be expelled using a propellant such as carbon dioxide or nitrogen. In one embodiment, the halogen may be bromine. In another embodiment, the halogen may be chlorine.

In another embodiment, the lignin in rice husk may be chemically modified with boric acid or boronic acid such that the free hydroxyl groups of lignin can be modified with boric acid or boronic acid moiety. In some embodiments, lignin in micronized rice husk may be modified with phosphoric acids and phosphines to form phosphoric acid esters.

In one embodiment, flame retardant composition comprising micronized rice husk comprising chemically modified lignin, or chemically modified silica, or both, may be used in the form of a dry powder as a fire extinguisher together with polyvinyl chloride thermoplastic additive, which, in some embodiments, acts as an oxygen excluding crust. In one embodiment, micronized rice husk comprising chemically modified lignin, or chemically modified silica, or both, may be used as a flame extinguisher in the form of wet slurry. In some embodiments, the slurry may be ejected under pressure using, for example, nitrogen or carbon dioxide as a propellant.

In one embodiment, micronized rice husk comprising unmodified lignin and unmodified silica may be used as flame retardant.

In another embodiment, the flame retardant composition comprising micronized rice husk includes chemically modified silica. Silica in micronized rice husk may be modified by the incorporation of functional groups that include, but are not limited to, carbonate group, amine group, hydroxyl group, silane, isocyanate, vinyl, siloxane, thiol, sulfate, phosphine, phosphate, boronic acid, and borate. In another embodiment, the micronized rice husk includes both chemically modified lignin and chemically modified silica.

In some embodiments, compositions comprising micronized rice husk comprising chemically modified lignin, or chemically modified silica, or both, can be used to extinguish forest fires or other outdoor fires, such as prairie fires, or may be used in controlled burns. In one embodiment, the silica may be modified to silica carbonate. In one embodiment, the flame retardant may be aerially sprayed from above the fire, e.g., to extinguish forest fire.

Use of Micronized Rice Husks in Polyurethane Foam

Polyurethane foams often contain residual organic solvents and other volatile organic compounds that are flammable. Urethane foams are used as cushion materials in shoes, seating, carpeting, clothing, and bedding to name a few applications. Urethane foams are also used as pre-filter and filter support materials for water and air filters.

Figure 8A:
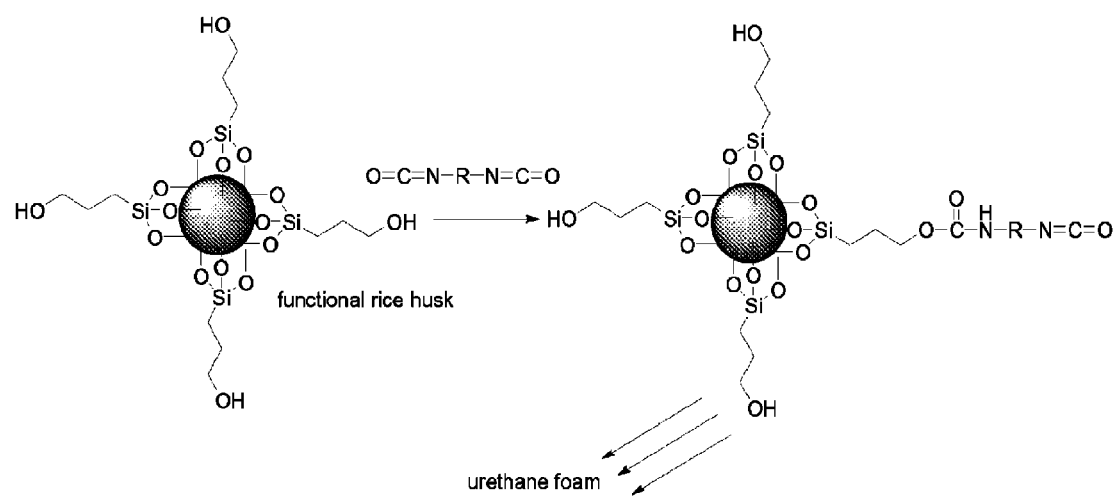
FIG. 8A shows an exemplary reaction schematics of the incorporation of micronized rice husk comprising chemically modified silica into urethane foam.
Figure 8B:
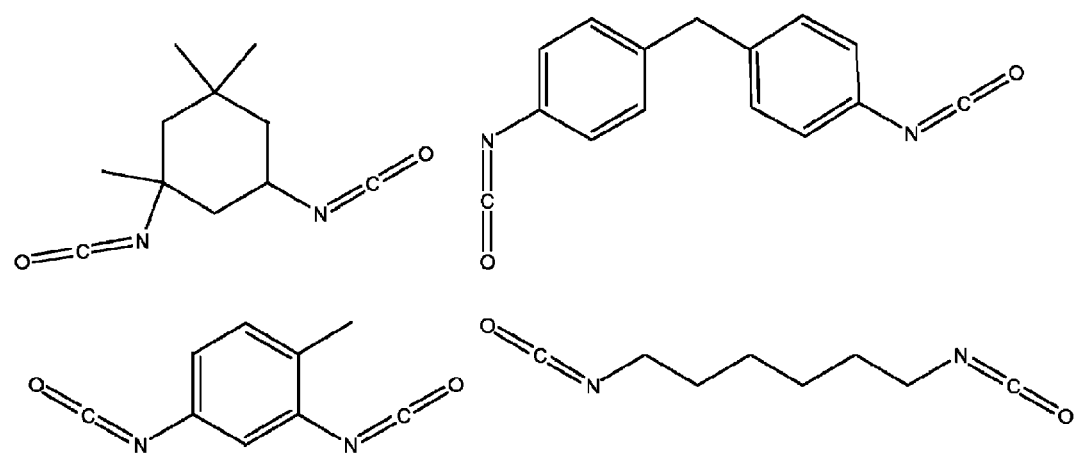
FIG. 8B shows exemplary alternative coupling agents.

Flame retardants comprising micronized rice husk can be incorporated into urethane foams. In some embodiments, the micronized rice husk can be modified to a polyol suitable for incorporation into urethane foams with surface modification as shown in FIG. 8 as an example. This incorporation of the flame retardant into the foam structure is superior to the current state of the art of employing brominated diphenyl ethers as flame retardants. In some embodiments, the rice husk may remain incorporated in the structure of the urethane foam. In contrast, brominated diphenyl ethers evaporate out of the foam over time where they can cause toxic effects on people and the surrounding area. Accordingly, the rice husk flame retardant compositions disclosed herein may provide for long term, non-harmful protection.

Use of Micronized Rice Husks in Textile Fabric

Fabric can be made of natural or synthetic fibers. Exemplary natural fibers include cotton (cellulose), silk (protein fiber), and wool (polypeptide). Synthetic fibers are by way of example but not by way of limitation, acrylic, nylon, and acetates. Both natural and synthetic textiles are flammable. Synthetic fibers have the added risk that they melt when heated and adhere to the skin. Flame resistant fabrics are useful in many applications, including the production of garments worn by workers in a variety of industries, including the military, electrical (for arc protection), petroleum chemical manufacturing, and emergency response fields. Cellulosic or cellulosic-blend fabrics have typically been preferred for these garments, due to the relative ease with which these fabrics may be made flame resistant and the relative comfort of such fabrics to the wearer. Current technologies used as flame retardants are considered harmful, having been linked to liver, thyroid, reproductive/developmental, and neurological effects.

Figure 9:
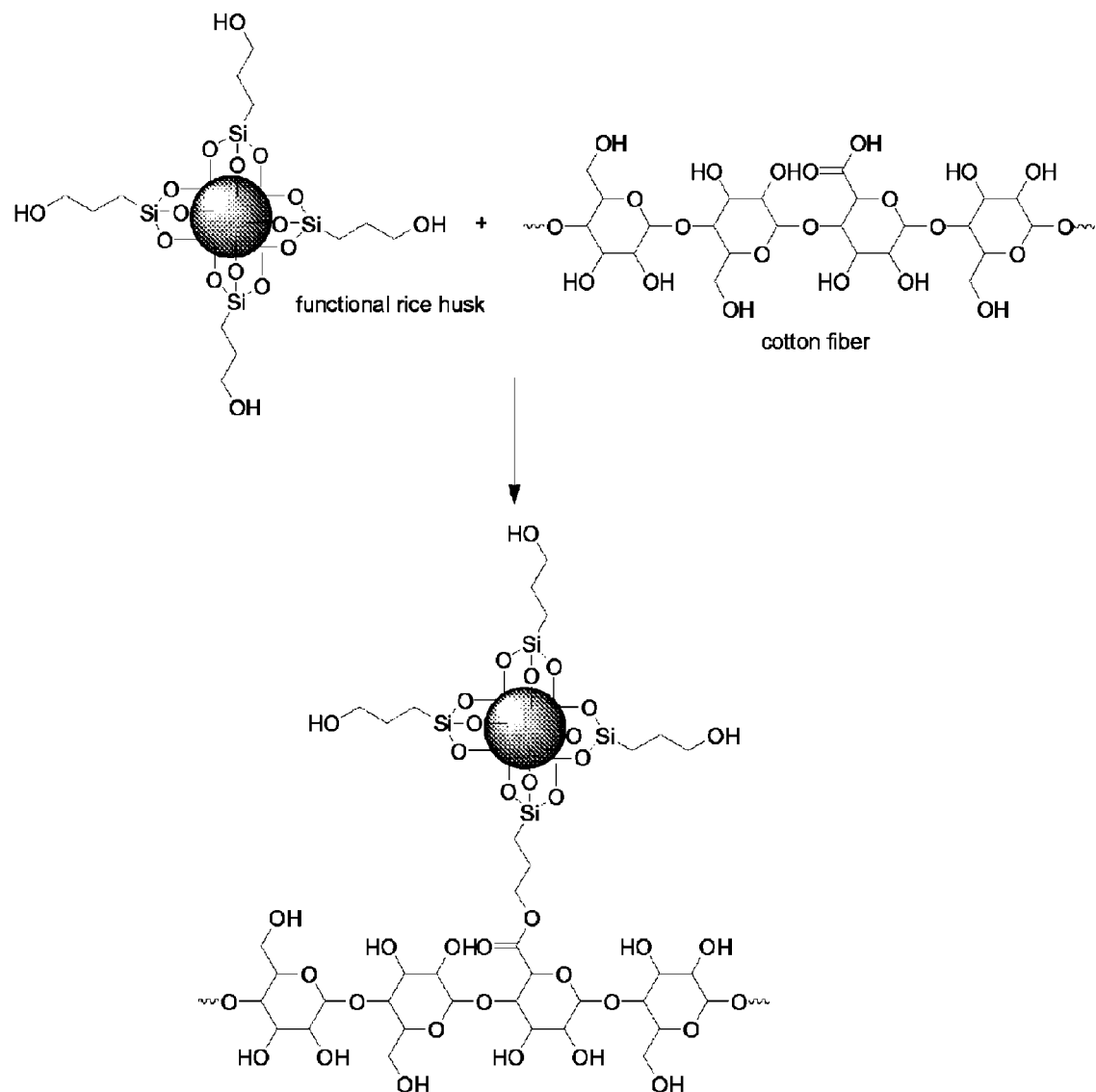
FIG. 9 shows an exemplary schematic representation of incorporating micronized rice husk comprising chemically modified silica into the cellulosic cotton fiber.

In some embodiments, micronized rice husk may be applied as a topical treatment to a fiber, fabric, or other textile item during processing to reduce its flammability. Additionally or alternatively, in some other embodiments, micronized rice husk that has been functionalized may be chemically bonded to natural and synthetic fibers to impart flame resistant properties to clothing material. FIG. 9 shows an exemplary schematic representation of incorporating micronized rice husk comprising chemically modified silica into the cellulosic cotton fiber. The attachment of the micronized rice husk takes place through the carboxy moieties contained in natural or synthetic fibers forming either amide or ester linkages depending upon the functionality used. Incorporation of the micronized rice husk provides fire retardant protection through many wash cycles in an environmentally friendly non-toxic manner.

The process described above is suitable for use with a variety of textile fabrics. In some embodiments, the weight percentages of cellulosic yarns and synthetic yarns contribute significantly to the success of the fabric in meeting flammability and other fabric requirements. In one embodiment, the fabrics may have a synthetic content of from about 0% to about 50% and a cellulosic content of from about 50% to about 100%. In some embodiments, the fabrics may have a synthetic content of from about 10% to about 65% and a cellulosic content of from about 35% to about 90%. In yet another embodiment, the fabric may have a synthetic content of from about 10% to about 50% and a cellulosic content of from about 50% to about 90%. In some embodiments, the fabric may be 100% cellulosic fabrics (such as 100% cotton denim). In some embodiments, the fabrics may have a synthetic content of at least about 50% to about 100%.

Use of Flame Retardant Comprising Micronized Rice Husk with a Substrate

The flame retardant comprising micronized rice husk comprising chemically modified lignin, or chemically modified silica, or both, can be used with a substrate to impart flame retardant properties to a substrate. In some embodiments, the substrate may be flammable in the absence of the flame retardant.

In some embodiments, the flame retardant may be applied directly on the substrate surface. In some embodiments, the flame retardant may be reacted with the substrate. In some embodiments, the flame retardant may be mixed with or combined with the substrate. In some embodiments, the flame retardant is covalently linked to the substrate. In some embodiments, the flame retardant may be non-covalently bound to the substrate.

In some embodiments, the substrate is solid. In some embodiments, the substrate may be a liquid. In other embodiments, the substrate may be a gel, paste, wet slurry, or foam. Exemplary substrates include, but are not limited to, wood, particle board, iron beams, concrete, plastic, ceramic, glass, cellulose, unsaturated polyester resins, vinylether resins, polyurethane resins, phenol resins, epoxy resins, polystyrene, ABS resin, polyethylene, polypropylene, polyvinyl chloride (PVC) resin, polyamine (PA), polyacrylates such as polymethyl methacrylate (PMMA), polycarbonate (PC), polyesters such as polyethylene terephthalate (PET) or polybutylene terephthalate (PBT), polyether sulfones (PES), polyether ketones or polyether sulfides (PES) or mixtures thereof, insulations of electrical cables, PVC pipes, paper, paint, pigment, varnishes, fabric, adhesives, and printed circuit board.

In some embodiments, the substrate may include materials used in buildings and the flame retardant may be used together with the substrate to impart flame retardant properties to the substrate. Exemplary substrate used in building materials include, but are not limited to, lumber, roof shingles, roof tiles such as concrete and clay roof tiles, stucco, cinder blocks, clay bricks, gypsum boards, rock wool, wooden logs, perlite board, sheet rock, plastic composites, paints, varnishes and sealers.

Additional Illustrative Embodiments

In some embodiments, the effective size of the micronized rice husk may be at least about 20 nm to about 750 µm. In some embodiments, the effective size of the micronized rice husk may be about 20 nm. In some embodiments, the effective size of the micronized rice husk may be at least about 100 nm. In some embodiments, the effective size of the micronized rice husk may be about 100 nm. In some embodiments, the effective size of the micronized rice husk may be at least about 500 nm. In some embodiments, the effective size of the micronized rice husk may be about 500 nm. In some embodiments, the effective size of the micronized rice husk may be at least about 1 µm to about 750 µm. In some embodiments, the effective size of the micronized rice husk may be at least about 1 µm. In some embodiments, the effective size of the micronized rice husk may be about 1 µm. In some embodiments, the effective size of the micronized rice husk may be at least about 50 µm. In some embodiments, the effective size of the micronized rice husk may be about 50 µm. In some embodiments, the effective size of the micronized rice husk may be about 100 µm. In some embodiments, the effective size of the micronized rice husk may be about 500 µm. In some embodiments, the effective size of the micronized rice husk may be at least about 50 µm to about 100 µm.

In some embodiments, the chemical modification of lignin comprises the addition of one or more of moieties including but not limited to: halogen, boric acid, boronic acid, phosphoric acid esters, sulfhydryl groups, sulfate groups, organic carbonate, and inorganic carbonate. In some embodiments, the halogen is bromine or chlorine.

In some embodiments, the silica of the rice husk may be chemically modified. In some embodiments, the chemical modification of silica includes the addition of one or more of functional groups including but not limited to: an amine group, a hydroxyl group, a silane, isocyanate, vinyl, siloxane, thiol, sulfate, phosphine, phosphate, boronic acid, and borate. In some embodiments, the functional group may be silane.

In some embodiments, the flame retardant may be in a dry powder form. In some embodiments, the flame retardant may be in a wet slurry form. In some embodiments, the flame retardant may be in the form of a liquid, paste, gel, or foam. In some embodiments, the flame retardant may include a propellant. In some embodiments, the propellant may include carbon dioxide and nitrogen.

In some embodiments, the flame retardant may be in the form of wet slurry, and the wet slurry is applied to the flame. In some embodiments, the flame retardant may be in the form of dry powder, and the dry powder is applied to the flame. In some embodiments, the flame retardant may be in the form of a foam, and the foam is applied to the flame. In some embodiments, the flame retardant may be in the form of a liquid, and the liquid is applied to the flame.

In some embodiments, the substrate may be flammable in the absence of the flame retardant. In some embodiments, the flame retardant may be linked to the substrate. In some embodiments, the flame retardant may be covalently linked to the substrate. In some embodiments, the flame retardant may be non-covalently bound to or associated with the substrate. In some embodiments, the substrate may be in the form of a solid. In some embodiments, the substrate may be in the form of a liquid, gel, paste, or foam. In some embodiments, the flame retardant may be present on a surface of the solid substrate. In some embodiments, the flame retardant may be mixed with the substrate. In some embodiments, the flame retardant may be applied to the surface of the solid substrate. In some embodiments, the substrate may be linked to the solid substrate. In some embodiments, the substrate may be covalently linked to the solid substrate. In some embodiments, the substrate may be non-covalently bound to or associated with the solid substrate.

In some embodiments, the substrate comprises one or more of wood, particle board, metal beams and rods, concrete, plastic, ceramic, glass, cellulose, unsaturated polyester resins, vinylether resins, polyurethane resins, phenol resins, epoxy resins, polystyrene, ABS resin, polyethylene, polypropylene, polyvinyl chloride (PVC) resin, polyamine (PA), polyacrylates such as polymethyl methacrylate (PMMA), polycarbonate (PC), polyesters such as polyethylene terephthalate (PET) or polybutylene terephthalate (PBT), polyether sulfones (PES), polyether ketones or polyether sulfides (PES) or mixtures thereof, insulations of electrical cables, PVC pipes, paper, paint, pigment, varnishes, fabric, cotton fiber, adhesives, and printed circuit board. In some embodiments, the substrate may be urethane foam. In some embodiments, the substrate may be cellulose of cotton fiber. In some embodiments, the substrate may be materials used in buildings. In some embodiments, the substrate includes roof shingles, roof tiles such as concrete, and clay roof tiles, stucco, cinder blocks, clay bricks, gypsum boards, rock wool, and perlite board. In some embodiments, the substrate may be paint, varnish, stain, resin, or an adhesive.

EXAMPLES

The present compositions and methods thus generally described, will be understood more readily by reference to the following examples, which are provided by way of illustration and are not intended to be limiting. The following is a description of the materials and experimental procedures used in the Examples.

Example 1: Micronizing Rice Husk

Rice husks are micronized to about 50 µm range (about 400 mesh). This size range is too large to be inhaled into the lungs, but has a surface area sufficient for effectiveness as a flame retardant.

Rice husks are micronized by milling the rice husks to preserve the lignin structure. Rice husks, which are composed of elastic fibers, are highly flexible. Thus, in the present example, a sharp blade method is employed to mill the husks. A schematic drawing of a rotating knife cutter that can be used to mill the rice husks is depicted in FIG. 1. Dried rice husks are fed from the hopper into the milling chamber where they are cut into pieces between the stationary and the high rpm rotating knives. By repetition of this the milling process, rice husks are cut into fine powders. The size of rice husk milled powders can be controlled by a screen inserted at the bottom of the milling chamber. The rice husks are continuously comminuted in the milling chamber until they become small enough to pass through the inserted screen. In this way the size of the micronized powder can be controlled.

Example 2: Bromination of Lignin in Rice Husk

Micronized rice husks are treated with bromine to brominate the lignin in the rice husk. Forty five grams (45 g) of milled rice hull powder (about 50 µm in diameter) is diluted with 50 ml of water and the slurry is heated to about 70° C. while stirring for about an hour. Next, about 2.5 g of chlorine is bubbled through a calibrated rotameter into the slurry over the course of 8 minutes. This is followed by the addition of 4.1 g of liquid bromine over a period of 10 minutes, concurrent with the addition of another 7.5 g of chlorine which is bubbled into the solution over the course of 30 minutes. The solid product is filtered off and washed with water. The product is dried under vacuum and has a final weight of about 62.0 g.

The amount of bromine that is reacted with lignin of the rice husk can vary from about 1% to about 300%, from about 5% to about 200%, or from about 10% to about 150% by weight of lignin. The reaction is terminated when bromine remains unconsumed in solution. Upon termination of the reaction, the reaction product is filtered and dried. This reaction will result in rice husk lignin bromination, for example, as shown in FIG. 3.

Lignin in micronized rice husks can be brominated by exemplary methods of U.S. Pat. No. 3,962,208, Lewin M. (Flame Retarding of Wood by Chemical Modification with Bromate-Bromide Solutions (1997) Journal of Fire Sciences 15: 29-51); Saka S. and Goring D. A. I. (The Distribution of Lignin in White Birch Wood as Determined by Bromination with TEM-EDXA (1988) Holzforschung—International Journal of the Biology, Chemistry, Physics and Technology of Wood 42(3): 149-153); and Saka S. et al. (Comparative studies on lignin distribution by UV microscopy and bromination combined with EDXA (1982) Wood Science and Technology 16(4): 269-277).

The brominated organic structure adds additional flame retardant capability to the substrate without harming the environment. When heated, the brominated lignin structure releases moieties that extinguish or reduce combustion. Unlike halogenated retardants currently available, the flame retardant and flame extinguisher active agent of the present disclosure is not a liquid or gas; it is a micronized rice husk. Accordingly, linked chemical moieties stay with the husk, and as such prevent the toxic effects that most halogenated flame retardants have.

Example 3: Reaction of Boron with Micronized Rice Husk

Micronized rice husks are treated with boron to boronate the lignin in the rice husk. The hydroxyl number of milled rice hull powder (about 50 µm in diameter) is determined to be 103 mg KOH per gram. Forty five grams (45 g) of milled rice hull (about 50 µm in diameter) is added to a reaction tube with 55 g of trimethoxy borate under argon. The mixture is heated to about 100° C. with shaking. The reaction is allowed to proceed for 5 hours. The vessel is cooled to room temperature and the liquids removed by rotary evaporation, followed by lyophilization. Final weight of the product is about 51.6 g.

Example 4: Silane Coupling to the Silica Component in Micronized Rice Husk

Micronized husks can be used for various applications. For some applications the surface of the husk may be functionalized which enables the rice husk particles to be used in a wide variety of applications. Polymers can be formed by placing functional moieties at the surface of the micronized husk. The functional moieties can also aid in dispersing the particles in solvents such as water or oil, or allow the attachment of the husk to fibers used in cloth. In one embodiment, the surface functionalization is by silane coupling to the Si—OH surface moieties on the husk particle.

The silane coupling agent, 3-hydroxy(or amino)propyltrimethoxysilane, is diluted in ethanol in order to make a 20% solution. The micronized rice husk is charged into a mixer and the silane solution (2% weight of rice husk) is added slowly to ensure uniform distribution of the coupling agent. After completion of the silane addition, the rice husk is continuously mixed for another 30 minutes at room temperature (about 25° C.). The treated micronized rice husk is then dried at 100° C. for about 5 hours to allow complete evaporation of the ethanol. An exemplary schematic representation of the process is shown in FIG. 7.

Example 5: Fire Extinguisher Using Micronized Rice Husk

Fire Extinguisher in the Form of Wet Slurry Formulation

One liter of deionized water is added to a 2 liter kettle equipped with mechanical stirrer. To the water, 10.0 g of Acrysol ASE-60 thickener (Dow Chemical Company) is added followed by the slow addition of 500 g of micronized rice husk comprising brominated lignin and silica chemically modified with silane. To the slurry, a 28% ammonia solution is added until the pH is 8.0. The result is a thick, water based slurry of the rice husk.

The slurry can be ejected under pressure using either nitrogen or carbon dioxide as a propellant. The slurry can be applied over or at the base of the flame to extinguish fire.

The embodiments, illustratively described herein, may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

While certain embodiments have been illustrated and described, it should be understood that changes and modifications can be made therein in accordance with ordinary skill in the art without departing from the technology in its broader aspects as defined in the following claims.

What is claimed is:

1. A flame retardant comprising:
    rice husk comprising silica and lignin, wherein the rice husk is micronized to an effective size, wherein the effective size of the rice husk is about 1 µm to about 750 µm,
    and wherein the lignin and the silica are chemically modified, wherein:
    lignin chemical modification comprises the addition of a moiety selected from the group consisting of chlorine, iodine, fluorine, phosphoric acid esters, sulfhydryl groups, sulfate groups, organic carbonate, and inorganic carbonate, and silica chemical modification comprises the addition of a functional group selected from the group consisting of an amine group, a hydroxyl group, a silane, isocyanate, vinyl, siloxane, thiol, sulfate, phosphine, and phosphate.

2. The flame retardant of claim 1, wherein the flame retardant is in the form of a dry powder, a wet slurry, or a liquid.

3. The flame retardant of claim 1, further comprising a propellant.

4. The flame retardant of claim 3, wherein the propellant includes an inert gas.

5. The flame retardant of claim 4, wherein the inert gas includes at least one of:
    carbon dioxide; or
    nitrogen.

6. A composition comprising a substrate and the flame retardant of claim 1.

7. A flame retardant comprising:
chemically modified rice husk, wherein the chemically modified rice husk includes:
silica, wherein the silica has been chemically modified with the addition of a functional group selected from the group consisting of:
an amine group;
a hydroxyl group;
a silane;
isocyanate;
vinyl;
siloxane;
thiol;
sulfate;
phosphine; and
phosphate; and
lignin, wherein the lignin has been chemically modified with the addition of a moiety selected from the group consisting of:
chlorine:
iodine;
fluorine;
phosphoric acid esters;
sulfhydryl groups;
sulfate groups;
organic carbonate; and
inorganic carbonate; and
wherein the chemically modified rice husk is micronized to an effective size, wherein the effective size of the chemically moditfied rice husk is between 10 μm to about 750 μm.

8. The flame retardant of claim 7, wherein the effective size of the chemically modified rice husk is about 50 μm.

9. The flame retardant of claim 7, wherein the functional group is selected from the group consisting of:
an amine group;
a hydroxyl group; and
a silane.

10. The flame retardant of claim 7, wherein the functional group is selected from the group consisting of:
isocyanate;
vinyl; and
siloxane.

11. The flame retardant of claim 7, wherein the functional group is selected from the group consisting of:
thiol;
sulfate;
phosphine; and
phosphate.

12. A flame retardant comprising:
chemically modified rice husk, wherein the chemically modified rice husk includes:
silica, wherein the silica has been chemically modified by reaction with 3-hydroxypropyltrimethoxysilane; and
lignin, wherein the lignin has been chemically modified by the addition of a moiety selected from the group consisting of phosphoric acid esters, sulfhydryl groups, sulfate groups, organic carbonate, and inorganic carbonate,
wherein the chemically modified rice husk is micronized to an effective size and wherein the effective size of the chemically modified rice husk is about 1 μm to about 750 μm.

13. The flame retardant of claim 12, wherein the reaction between the silica and 3-hydroxypropyltrimethoxysilane results in a functional group that includes silicon hydroxide.

14. The flame retardant of claim 12, wherein the moiety is a phosphoric acid ester.

15. The flame retardant of claim 12, wherein the moiety is selected from the group consisting of:
sulfhydryl groups; and
sulfate groups.

16. The flame retardant of claim 12, wherein the moiety is selected from the group consisting of:
organic carbonate; and
inorganic carbonate.

* * * * *

UNITED STATES PATENT AND TRADEMARK OFFICE
CERTIFICATE OF CORRECTION

PATENT NO. : 9,834,726 B2  
APPLICATION NO. : 14/655293  
DATED : December 5, 2017  
INVENTOR(S) : Carlson et al.

Page 1 of 1

It is certified that error appears in the above-identified patent and that said Letters Patent is hereby corrected as shown below:

In the Claims

In Column 16, Lines 44-45, in Claim 1, delete "and wherein...wherein:" and insert the same at Line 43, as a continuation sub-point, therefor.

In Column 16, Line 50, in Claim 1, delete "carbonate, and" and insert -- carbonate; and --, therefor.

In Column 16, Lines 50-54, in Claim 1, delete "silica chemical...and phosphate." and insert the same at Line 51 as a new sub-point, therefor.

In Column 17, Line 20, in Claim 7, delete "chlorine:" and insert -- chlorine; --, therefor.

In Column 17, Line 30, in Claim 7, delete "moditfied rice" and insert -- modified rice --, therefor.

In Column 18, Line 23, in Claim 12, delete "size and" and insert -- size, and --, therefor.

Signed and Sealed this  
Third Day of July, 2018

Andrei Iancu  
*Director of the United States Patent and Trademark Office*